July 6, 1954  A. R. MOENKE  2,683,248
EXCITATION SYSTEM FOR ALTERNATING CURRENT GENERATORS
Filed Jan. 10, 1952
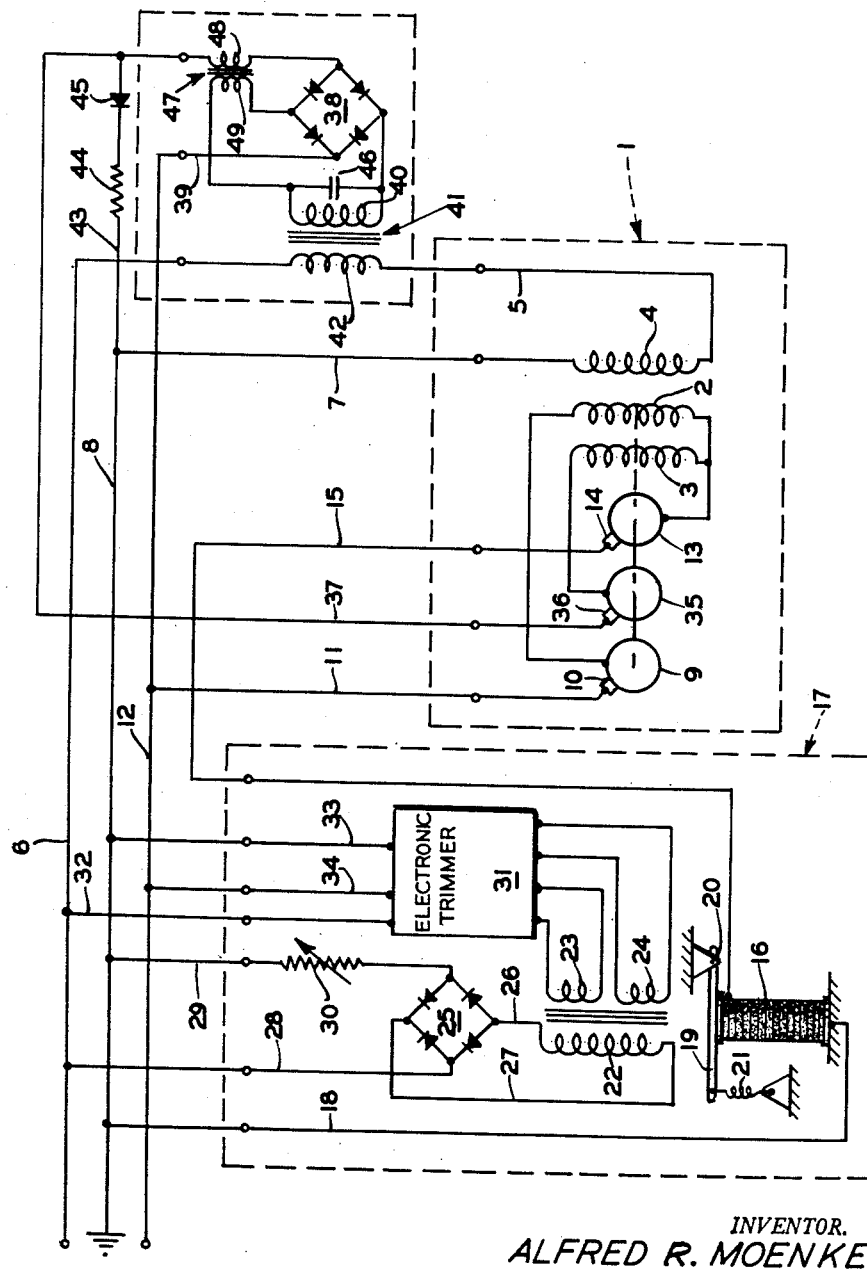
INVENTOR.
ALFRED R. MOENKE
BY
ATTORNEY Patented July 6, 1954

2,683,248

UNITED STATES PATENT OFFICE 2,683,248

EXCITATION SYSTEM FOR ALTERNATING CURRENT GENERATORS

Alfred R. Moenke, Clifton, N. J., assignor to Bendix Aviation Corporation, Teterboro, N. J., a corporation of Delaware Application January 10, 1952, Serial No. 265,747

10 Claims. (Cl. 322—24)

The present invention relates to dynamoelectric machines and more particularly to an excitation system for dynamoelectric machines.

A copending application, Serial No. 265,858, filed January 10, 1952, by Harold G. Haas, discloses and claims a system for the excitation of alternating current generators in which the regulating field is connected in series with the compounding field. In the aforenoted arrangement, the maximum ampere turns supplied by the bus is at no-load. In certain applications, the ampere turns supplied by the direct current bus to the regulating field are not sufficient for the no-load ampere turn requirement. In the present invention, the compounding field is arranged for excitation by the bus to supply the additional ampere turns necessary to meet the requirements.

The excitation supplied by the compounding source is substantially independent of frequency and is proportional to the load current of the generator. It is apparent that for a generator operating over a wide speed range, the excitation supplied by the compounding source at low speeds would be more than that required for excitation at high speeds for the same load. At the high speeds, the voltage regulator would not be able to hold the generator voltage to the desired value. The present invention provides means for decreasing the compounding current with increase in frequency.

It is an object of the invention to provide improved excitation means for a generator.

Another object of the invention is to provide improved regulation for a dynamoelectric machine.

Another object of the invention is to provide an improved dynamoelectric machine.

Another object of the invention is to provide improved no-load excitation for a dynamoelectric machine.

Another object of the invention is to provide frequency compensation for the excitation of a dynamoelectric machine.

These and other objects and features of the invention will appear more fully hereinafter from a consideration of the following description taken in connection with the accompanying drawing wherein one embodiment of the invention is illustrated by way of example.

In the drawing the single figure of the drawing is a schematic diagram of a generator and associated circuits embodying the invention.

Referring now to the drawing there is illustrated an alternating current generator 1 having a regulating armature winding 2, a compounding armature winding 3 and a stator field winding 4. The generator 1 may be driven from any suitable source such as from the engine of an aircraft (not shown).

One end of the winding 4 is connected by output conductor 5 to A. C. bus 6. The other side of the winding 4 is connected by conductor 7 to ground bus 8. It is understood however that the bus 8 may not be ground inasmuch as the system could be ungrounded.

One end of the regulating winding 2 is connected to slip ring 9 which in turn is connected by brush 10 and conductor 11 to positive D. C. bus 12. The other end of the winding 2 is connected to slip ring 13 which in turn is connected by brush 14 and conductor 15 to one end of a carbon pile element 16 of a regulator 17. The other end of the carbon pile element 16 is connected by conductor 18 to the grounded bus 8.

The regulator 17 is shown diagrammatically as including an armature 19, pivoted at 20 and exerting a compressive force upon the carbon pile 16 under the tension of a spring 21. The spring 21 is arranged so as to balance the pull on the armature 19 by electromagnetic windings 22, 23 and 24 for a predetermined output. The winding 22 is connected across the output of a rectifier 25 by conductors 26 and 27. One input terminal of the rectifier 25 is connected by a conductor 28 to the A. C. bus 6. The other input terminal of the rectifier 25 is connected by a conductor 29 to the grounded bus 8. A variable resistor 30 may be inserted in the conductor 29 to permit adjustment of the winding 22.

The windings 23 and 24 are connected to the output of an electronic trimmer 31. The electronic trimmer 31 may be of the type described and claimed in application Serial No. 690,459 of John F. Emerson filed August 14, 1946, and assigned to Bendix Aviation Corporation, now U. S. Patent No. 2,611,121. The input of the trimmer 31 is connected by conductors 32 and 33 across the A. C. output of the generator 1. B+ for the trimmer 31 is obtained from the D. C. bus 12 through conductor 34.

One end of the winding 3 is connected to the end of the winding 2 adjacent the slip ring 13. The other end of the winding 3 is connected by slip ring 35, brush 36 and conductor 37 to one of the output terminals of rectifier 38. The other output terminal of the rectifier 38 is connected by a conductor 39 to the positive bus 12. The input of the rectifier 38 is connected across secondary winding 40 of current transformer 41.

The transformer 41 has a primary winding 42 in series with the conductor 5.

The aforenoted arrangement is similar to that described and claimed in copending application Serial No. 265,859, filed by Harold G. Haas.

The novel features of the present invention are directed to improve the excitation at no load and light loads, also to frequency compensation of the excitation supply.

In order to supply the ampere turn requirements for no load and light loads, the windings 3 and 2 in addition to being connected across the output of the rectifier 38 are connected by a conductor 43, resistor 44 and rectifier 45 across the D. C. supply.

In order to compensate for frequency a capacitor 46 is connected across the secondary winding 40 of the current transformer 41. The capacitor 46 shunts more current from the rectifier 38 at high frequencies and prevents over excitation and resultant high voltages.

Additional frequency compensation may be obtained by a saturable reactor 47 having an alternating current winding 48 connected in the input of the rectifier 38 and a direct current winding 49 connected in the output circuit of the rectifier 38.

In operation, the D. C. bus supplies the compounding field with current at no load and for light loads. When the compounding supply voltage reaches and exceeds the bus voltage, the rectifier 45 prevents a reversal of current flow to the bus. In other words, the bus can supply the compounding current only when the voltage from the compounding rectifier 38 is below that of the bus. The resistor 44 has a value such as to give a reasonable value of maximum pile ohms for the regulator at no load, maximum speed.

In a generator adapted for operation over a wide speed range, the excitation supplied by the compounding at the low speeds would be more than the required excitation for high speeds. Thus, the carbon pile voltage regulator would not be able to hold the voltage within the desired limits. By the provision of the capacitor 46, as the frequency rises, more current is shunted from the rectifier 38. The slope of the frequency compensation curve can be controlled by the choice of values for the capacitor.

The saturable reactor 49 permits frequency compensation to a greater extent and at the same time, the ratio of the compounding supply output current to load current will increase with load.

It is understood that the reactor and capacitor may be used either separately or together for frequency compensation depending upon the requirements of the system.

Although only one embodiment of the invention has been illustrated and described, various changes in the form and relative arrangement of the parts may be made to suit requirements.

What is claimed is:

1. An excitation system for an alternating current generator having a pair of field windings and an output winding coupled to a load circuit, comprising an independent source of direct current connected to one of said field windings, a current transformer in series with said load, rectifier means connecting the output of said current transformer in series with both of said field windings, and means including a blocking rectifier for connecting both of said windings to said independent source upon the voltage of said independent source exceeding the voltage from said current transformer.

2. The combination as set forth in claim 1 and including frequency responsive means connected in the output of said current transformer to affect the output thereof inversely with frequency.

3. An excitation system for an alternating current generator having an excitation winding and an output winding coupled to a load circuit, comprising an independent source of direct current, means including a variable resistance element for connecting a portion of said excitation winding across said independent source, a current transformer in series with said load circuit, means including a rectifier for connecting the output of said current transformer across said excitation winding, and polarized means for connecting said excitation winding across said independent source upon the output of said current transformer being below a predetermined minimum.

4. The combination as set forth in claim 3 and including a capacitor connected across the input of said rectifier and being so proportioned to effect a decrease in excitation upon an increase in frequency.

5. An excitation system for a generator having a regulating field winding, a compounding field winding and output windings coupled to a load circuit; comprising a source of substantially constant direct current, means including a variable resistance element for connecting said regulating winding across said constant direct current, means responsive to the output voltage of said output windings for varying said resistance element to maintain said output voltage substantially constant, current responsive means connected in said output circuit to produce an output as a function of said current, means for connecting both of said field windings in series across said last mentioned output, and means including a blocking rectifier for connecting both of said field windings across said constant direct current upon the current in said output circuit being below a predetermined value.

6. The combination as set forth in claim 5 and including frequency responsive means adapted to affect said current responsive means as an inverse function of frequency.

7. An excitation system for a dynamoelectric machine having a regulating winding, a compounding winding and an output winding, comprising a source of substantially constant voltage, means including a variable resistance element for connecting said regulating winding across said constant voltage source, means responsive to the output of said machine to vary said resistance element to maintain said output at a predetermined value, means responsive to the current in said output winding to produce a voltage proportional to said current, means for connecting said compounding and regulating windings in series across said last voltage means, and means including a blocking rectifier connecting said compounding and regulating windings in series across said constant voltage, said blocking rectifier being poled to permit current flow from said constant voltage source.

8. A voltage regulating system for a generator having a regulating field winding, a compounding field winding and an output winding connected to a load, comprising a source of substantially constant potential for exciting said regulating field winding, voltage regulating means responsive to the voltage across said output winding for controlling the excitation of said regulating field winding, means including a current transformer in series with said load for producing a potential proportional to said load current for exciting both of said field windings in accordance with said load, and means including a blocking rectifier for connecting said compounding winding in series with said regulating field winding across said constant potential source upon the potential produced by said load current being below that of the constant potential.

9. An excitation system for a variable speed alternating current generator having a pair of field windings and an output winding coupled to a load circuit, comprising a source of constant potential direct current connected to one of said field windings, a current transformer in series with said load, rectifier means connecting the output of said current transformer in series with both of said field windings, and frequency responsive means associated with the input of said rectifier to reduce the input thereof with increase in frequency.

10. An excitation system for an alternating current generator adapted to be driven at variable speeds and having a regulating field winding, a compounding field winding and an output connected to a load, comprising a source of substantially constant direct current, for energizing said regulating winding, current responsive means for producing a voltage proportional to the current in said output winding for energizing said compounding winding, and means responsive to the output frequency of said generator to decrease said last voltage upon an increase in said frequency.

References Cited in the file of this patent

UNITED STATES PATENTS

| Number | Name | Date |
|---|---|---|
| 1,646,821 | Karapetoff | Oct. 25, 1927 |
| 1,857,174 | Zucker | May 10, 1932 |
| 2,610,315 | McKendry et al. | Sept. 9, 1952 |